(12) United States Patent
Jacob et al.

(10) Patent No.: US 7,530,897 B2
(45) Date of Patent: May 12, 2009

(54) SLIDING ARTICULATION

(75) Inventors: Werner Jacob, Frankfurt am Main (DE); Martin D. Jacob, Braunschweig (DE)

(73) Assignee: Shaft-Form-Engineering GmbH, Mülheim am Main (DE)

( * ) Notice: Subject to any disclaimer, the term of this patent is extended or adjusted under 35 U.S.C. 154(b) by 83 days.

(21) Appl. No.: 10/524,392

(22) PCT Filed: Jul. 9, 2003

(86) PCT No.: PCT/EP03/07387

§ 371 (c)(1),
(2), (4) Date: Nov. 18, 2005

(87) PCT Pub. No.: WO2004/018888

PCT Pub. Date: Mar. 4, 2004

(65) Prior Publication Data

US 2006/0166749 A1    Jul. 27, 2006

(30) Foreign Application Priority Data

Aug. 14, 2002  (DE) ............................... 102 37 169

(51) Int. Cl.
    *F16D 3/06* (2006.01)
(52) U.S. Cl. ........................................ 464/167; 384/51
(58) Field of Classification Search ................. 464/146, 464/162, 167; 384/49, 51, 525, 55, 52
    See application file for complete search history.

(56) References Cited

U.S. PATENT DOCUMENTS

| | | | |
|---|---|---|---|
| 3,452,558 A | 7/1969 | Hutchingson et al. | 464/146 |
| 3,488,979 A * | 1/1970 | Croset | |
| 3,656,318 A | 4/1972 | Smith et al. | 464/146 |
| 4,357,810 A | 11/1982 | Kumpar | |
| 4,573,947 A | 3/1986 | Schmidt | 464/146 |
| 5,026,325 A | 6/1991 | Welschof | 464/146 |
| 5,692,961 A | 12/1997 | Turner | 464/146 |
| 2001/0018369 A1 * | 8/2001 | Cermak et al. | 464/167 |
| 2001/0049309 A1 | 12/2001 | Perrow | 464/146 |

FOREIGN PATENT DOCUMENTS

| | | |
|---|---|---|
| DE | 2114536 | 7/1972 |
| DE | 3710518 | 7/1988 |
| DE | 3808947 | 5/1989 |
| DE | 4319885 | 12/1994 |
| DE | 19911111 | 1/2001 |
| GB | 2203220 | 3/1988 |

* cited by examiner

*Primary Examiner*—Greg Binda
(74) *Attorney, Agent, or Firm*—Collard & Roe, P.C.

(57) ABSTRACT

A sliding articulation includes an outer hub wherein is housed an inner hub. The outer hub and the inner hub include corresponding respective raceways wherein are housed balls which are guided by a cage arranged between the outer hub and the inner hub. The inner hub can slide freely relative to the outer hub in the axial direction, between a first stop and a second stop, over a distance, when the balls roll in the raceways and it can slide over a second distance when the balls slide in the raceways.

14 Claims, 4 Drawing Sheets

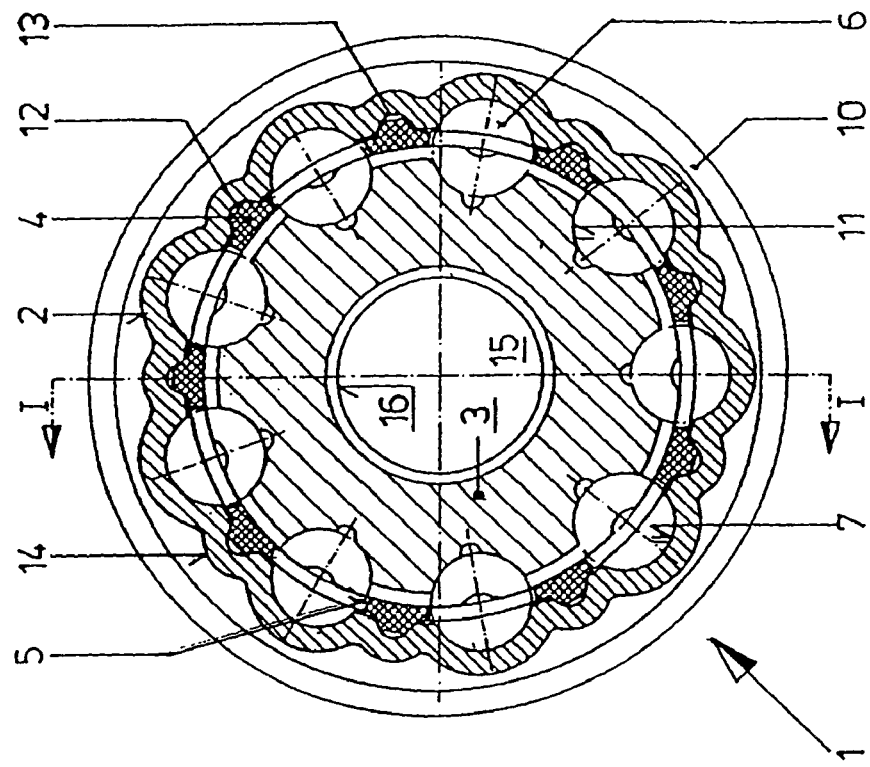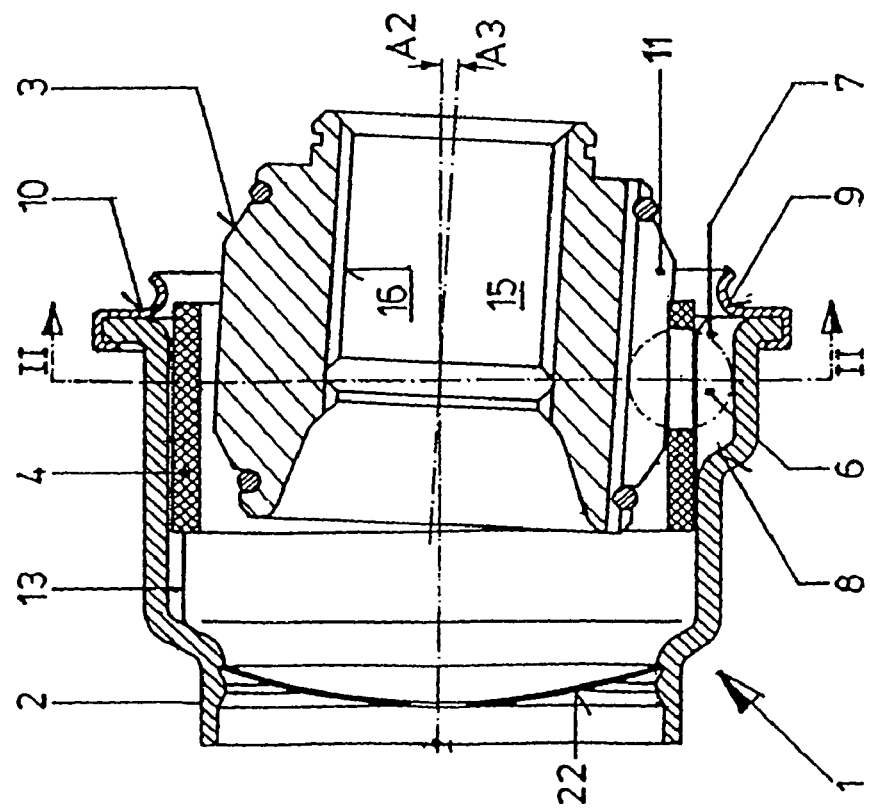

SLIDING ARTICULATION

CROSS REFERENCE TO RELATED APPLICATIONS

Applicants claim priority under 35 U.S.C. §119 of German Application No. 102 37 169.5 filed on Aug. 14, 2002. Applicants also claim priority under 35 U.S.C. §365 of PCT/EP2003/007387 filed on Jul. 9, 2003. The international application under PCT article 21(2) was not published in English.

BACKGROUND OF THE INVENTION

1. Field of the Invention

The invention relates to a sliding articulation, which can be used in articulated shafts of motor vehicles or the like, having an outer hub that surrounds a cavity and has raceways in its inner surface, which extend parallel to the axis of the sliding articulation, an inner hub accommodated in the cavity, which has raceways on its outer surface, which extend parallel to the axis of the sliding articulation and lie opposite the raceways of the outer hub, and accommodate a ball together with these, in pairs, in each instance, and having a cage disposed between the outer hub and the inner hub, which guides the balls in an axial direction.

2. The Prior Art

In articulated shafts, which are used, for example, as longitudinal shafts or lateral shafts in motor vehicles, to transfer a drive torque from the transmission to the drive wheels, it is usual to allow a change in length of the shaft for assembly purposes or to equalize axial movements during operation. In DE 199 11 111 C1, for example, an arrangement having a synchronous fixed articulation is proposed, which has a slide journal and a slide sleeve segment that surrounds the latter, both of which have grooves for accommodating balls, which grooves are assigned to one another. The slide journal is connected with the slide sleeve segment so as to rotate with it, by means of these balls, while an axial movement of the slide journal relative to the slide sleeve segment is possible. However, the construction space required for such an arrangement is large, because of the separation of the articulation from the sliding unit.

An articulation of the type stated initially is known from DE patent 2 114 536, which allows the equalization of angles of inclination of two shaft ends, as a synchronous articulation and, at the same time, as a sliding articulation, allows an axial change of the distance between the shaft ends, relative to one another. The cage of this articulation is provided with an outer ball surface that is guided in an inner ball surface of the outer hub, so that the cage is held in the outer hub in the axial direction. As a result, a movement of the balls accommodated in the raceways, relative to the outer hub, is not possible, so that the balls cannot roll in the raceways, and instead a relative movement between the outer hub and the inner hub is only possible by means of a displacement of the balls in the raceways of the inner hub. Displacement of the balls in the raceways results in high friction moments in the articulation, which result in heating during operation and more rapid wear.

It is therefore the task of the invention to make available a sliding articulation of the type stated initially, in which the friction in operation is reduced, while at the same time, it allows the relative movement between the inner hub and the outer hub that is required for assembly.

SUMMARY OF THE INVENTION

This task is accomplished, according to the invention, in that the inner hub is freely displaceable relative to the outer hub, in the axial direction, between a first stop and a second stop, over a first distance, by means of rolling of the balls in the raceways, and displaceable over an additional distance by means of sliding of the balls in the raceways. In a defined region, which is delimited by two stops, the balls can therefore roll in the raceways, in order to allow an axial movement between the inner hub and the outer hub. By means of the rolling of the balls in the raceways, a friction loss that can be ignored, as compared with sliding of the balls in the raceways, is all that occurs. In this connection, the distance that the balls can roll in the raceways is designed in such a manner that it can absorb the axial displacement of the inner hub relative to the outer hub that usually occurs during operation. If a greater displacement of the inner hub relative to the outer hub becomes necessary during assembly, for example, the balls can be displaced by sliding in the raceways over an additional distance, in addition to the first distance where the balls roll in the raceways. The friction losses that occur in this connection do not result in greater wear or heating of the articulation, since this displacement occurs only once during assembly.

Preferably, the cage is freely displaceable relative to the inner hub and relative to the outer hub, in the axial direction. In this manner, it is assured that the cage does not prevent the balls in the raceways from rolling, thereby causing additional friction losses between the cage and the balls.

According to one embodiment of the invention, the cage is guided on the inner hub. This can be achieved, for example, in that the cage is a folding cage having cage guide ridges that engage into the raceways of the inner hub. Furthermore, the cage, also as a folding cage, can be provided with cage guide ridges that engage in centering grooves of the inner hub, which are formed in the ridges between the raceways.

Alternatively to this, it is possible that the cage is guided on the outer hub, for example in that the cage has cage guide ridges that project radially outward, which engage in centering grooves of the outer hub that are formed in the ridges between the raceways.

A particularly efficient production of the sliding articulation according to the invention is possible if the outer hub is a shaped sheet-metal part in which the raceways are formed without cutting. In this manner, the weight of the articulation is also reduced, so that the centripetal forces generated by the articulation and the vibrations caused by them can be kept low during operation.

According to a preferred embodiment of the invention, the inner hub has a central bore having a plug-in tooth system. In this embodiment of the inner hub, the sliding articulation can be pushed onto an appropriately contoured journal, in order to produce a connection between the journal and the inner hub that displays integral rotation, as well as centering the sliding articulation. In this connection, centering of the sliding articulation by way of the inner hub is particularly advantageous, since lower balance errors occur with the same tolerances, as compared with centering by means of a flange on the outer hub, for example, thereby producing lower centripetal forces and therefore fewer vibrations and noises during operation.

The first distance, in which the balls roll in the raceways, is delimited, according to the invention, by two stops that can be formed by the ends of the raceways in the outer hub. Alternatively or in addition, this first distance, in which the balls can roll in the raceways, can be delimited by means of one or more split rings inserted into the raceways of the inner hub, as stops.

BRIEF DESCRIPTION OF THE DRAWINGS

The invention will be explained in greater detail in the following on the basis of exemplary embodiments, making reference to the drawing.

This shows:

FIG. 1 a cross-sectional view of the sliding articulation according to a first embodiment, FIG. 2 a cross-section through the sliding articulation according to FIG. 1, along the line II-II, FIG. 3 a cross-sectional view of the sliding articulation according to a second embodiment, FIG. 4 a cross-section through the sliding articulation according to FIG. 3, along the line IV-IV, FIG. 5 a cross-sectional view of the sliding articulation according to another embodiment, FIG. 6 an enlarged detail view of a sliding articulation according to another embodiment, FIG. 7 in a detail, a cross-sectional view through the sliding articulation according to FIG. 5, along the line VII-VII.

DETAILED DESCRIPTION OF PREFERRED EMBODIMENTS

Figure 4:
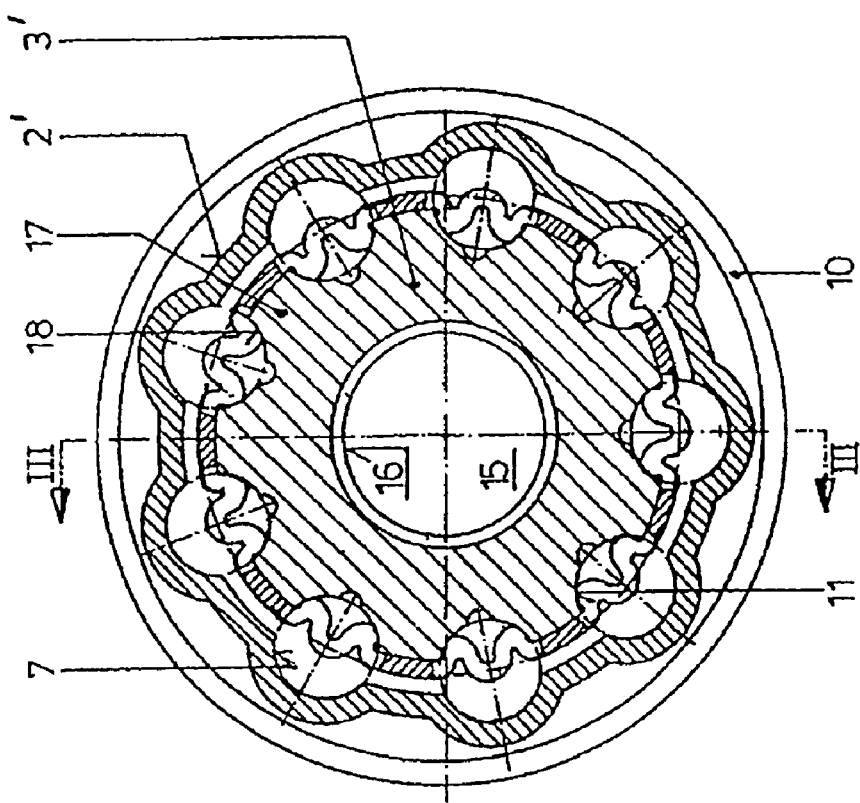

The figures show a sliding articulation 1 having an essentially cylindrical outer hub 2, 2', 2", an inner hub 3, 3', 3" accommodated in the cavity defined by the outer hub 2, 2', 2", and a cage 4, 4', 4", which cage is guided between the outer hub 2, 2', 2" and the inner hub 3, 3', 3". In this connection, the cage 4, 4', 4" has nine windows 5, which are distributed at uniform intervals along the circumference of the cage 4, 4', 4", and in each of which a ball 6 is accommodated.

In the outer hub 2, 2', 2", nine raceways 7 that correspond to the windows 5 of the cage 4, 4', 4" are formed, which raceways essentially extend parallel to the axis $A_2$ of the sliding articulation 1. In this connection, the raceways 7 are delimited on the one side by means of a step 8 of the outer hub 2, 2', 2", and on the other side by means of a delimitation stop 9, which is formed by a folded bellows carrier 10 attached to the outer hub 2, 2', 2".

In the inner hub 3, 3', 3", as well, nine raceways 11 are formed, which run parallel to the axis $A_3$ of the inner hub 3, 3', 3", which coincides with the axis $A_2$ of the outer hub 2, 2', 2", as the axis of the articulation, when the inner hub 3, 3', 3" is centered in the outer hub 2, 2', 2". In this connection, the balls 6 are accommodated in the raceways 7 and 11 of the outer hub 2, 2', 2" and the inner hub 3, 3', 3", which are assigned to one another in pairs, so that the outer hub 2, 2', 2" is connected with the inner hub 3, 3', 3" so as to rotate with it, but to be axially displaceable.

In the embodiment shown in FIGS. 1 and 2, the cage 4 is provided with cage guide ridges 12 that project outward in the radial direction, which engage in corresponding centering grooves 13 of the outer hub 2. In this connection, the centering grooves 13 of the outer hub 2 are formed in the ridges 14 between the raceways 7. The cage 4 is therefore guided to be freely displaceable in the axial direction, relative to the outer hub 2 and the inner hub 3.

The inner hub 3 of the sliding articulation 1 has a central bore 15 that is provided with a plug-in tooth system 16, in order to accommodate a journal, not shown, for integral rotation. The sliding articulation 1 can also be centered relative to the journal, by way of the bore 15 having the plug-in tooth system 16.

The cage 4 is guided in the outer hub 2 such that due to the length of the guiding surface between the cage and the hub, the cage 4 is not pivotable with respect to the outer hub 2 as shown in FIGS. 1 and 2. Thus, the cage 4 is pivotable only with respect to the inner hub 3.

As shown in FIGS. 1 and 2, the size or shape of the inner and outer hub raceways 11, 7 differs from the size or shape of the centering grooves 13, and the size of the cross-section of the centering grooves 13 is smaller than the size of the cross-section of the inner and outer hub raceways 11, 7.

Figure 3:
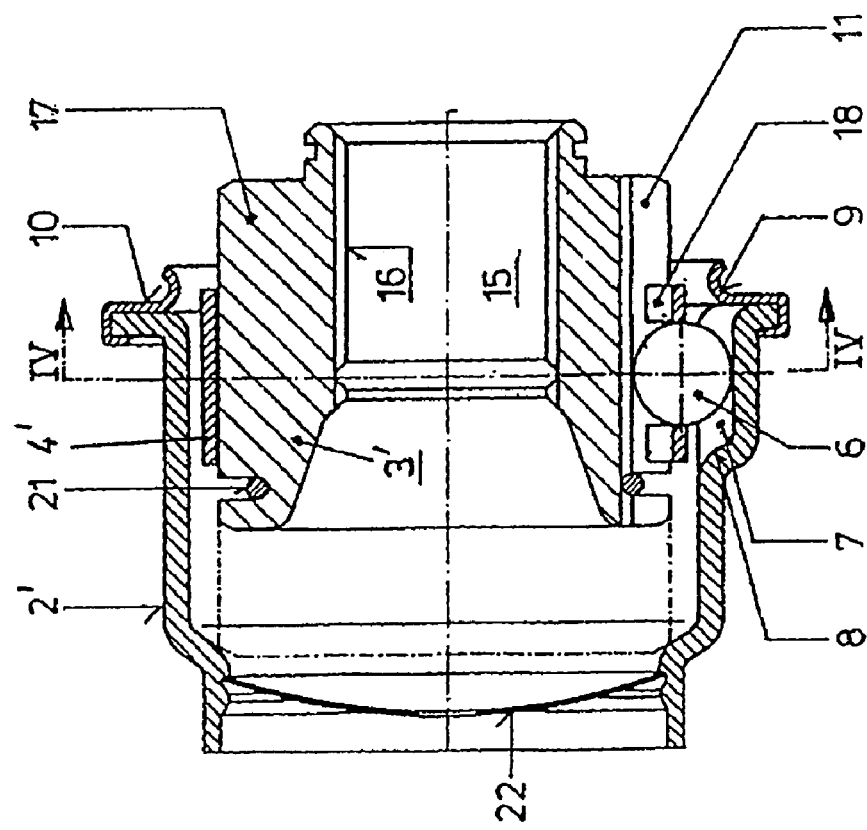

In contrast to the embodiment shown in FIGS. 1 and 2, the cage 4' is guided on the inner hub 3' in the case of the sliding articulation according to FIGS. 3 and 4. For this purpose, the cage 4' is configured as a folding cage, i.e. the cage 4' has a wave-shaped profile in the cross-section, as shown in FIG. 4. In this connection, the case 4' lies on ridges 17 on the outer surface of the inner hub 3', in certain regions, which are formed between the raceways 11 of the inner hub 3'. At the same time, the cage 4' projects into the raceways 11 of the inner hub 3' with cage guide ridges 18, in certain regions, so that the cage 4' is guided on the inner hub 3' so that it cannot rotate, and so that it can be displaced in the axial direction.

Figure 5:
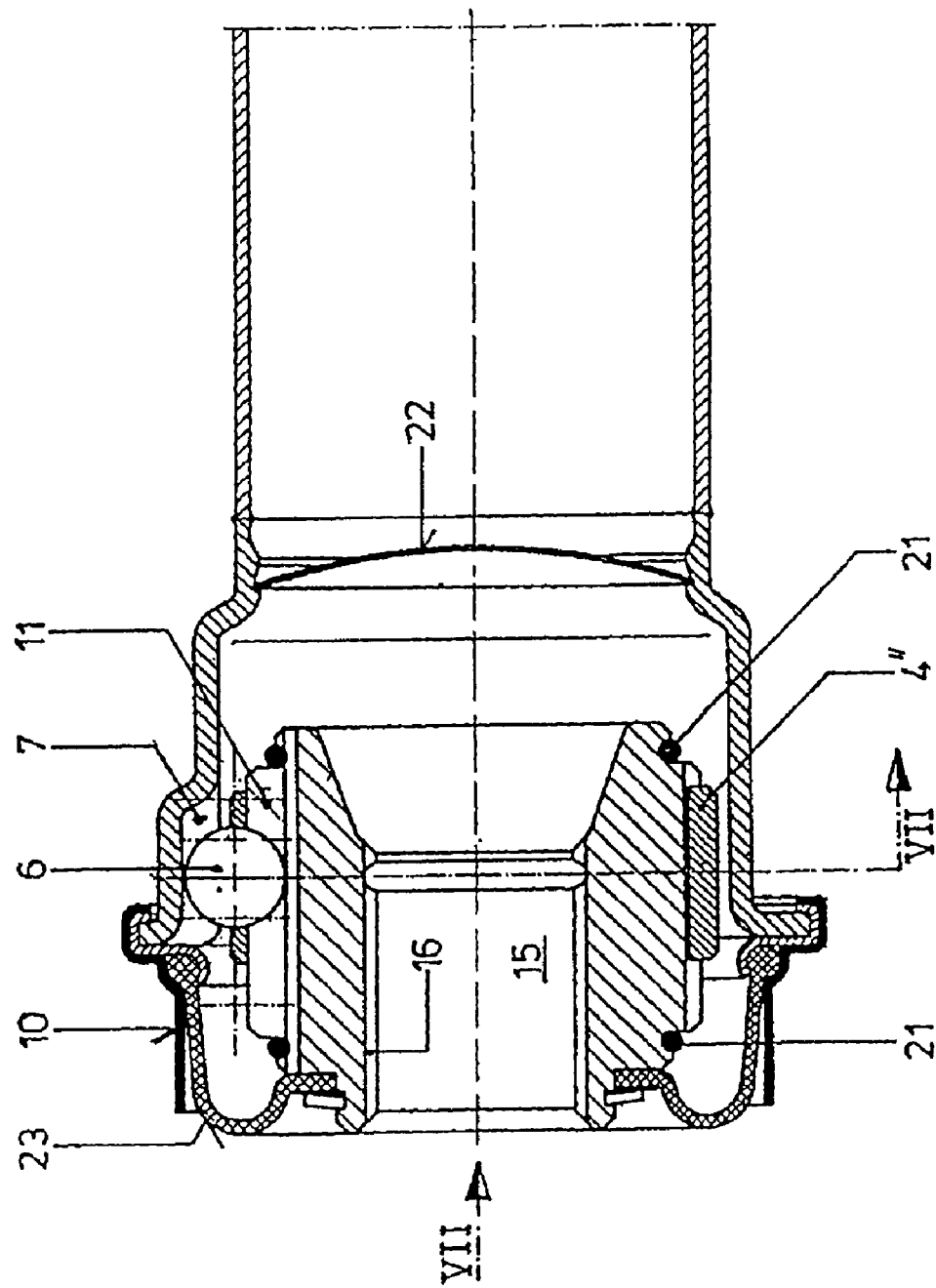
Figure 6:
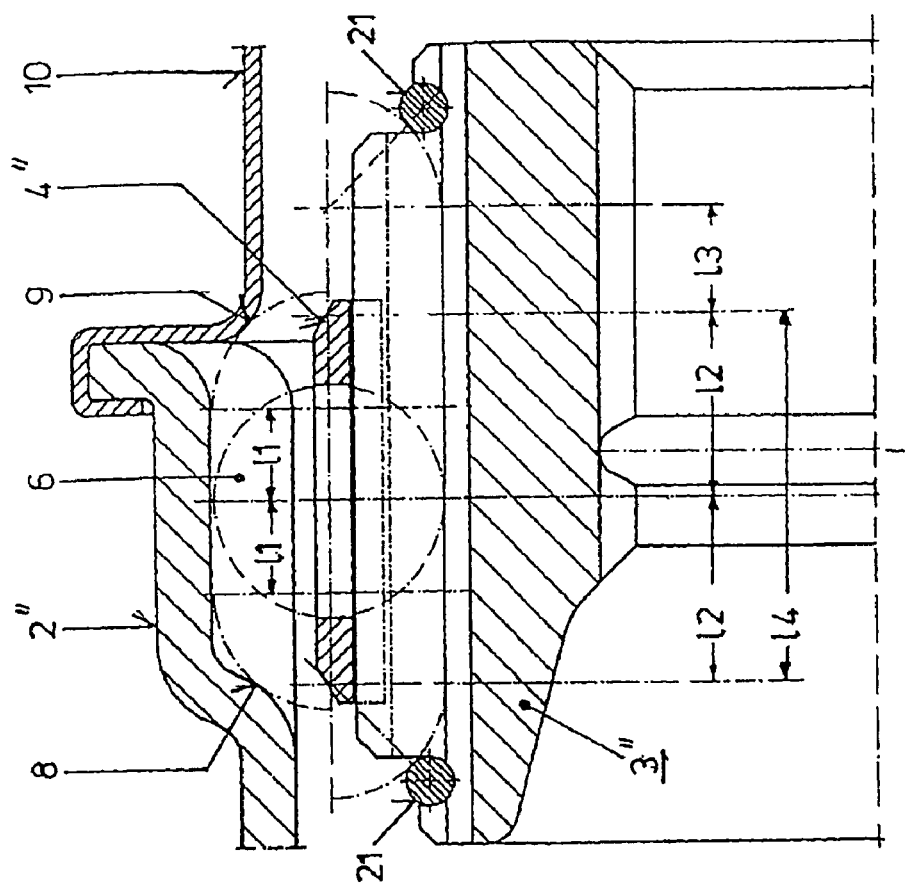
Figure 7:
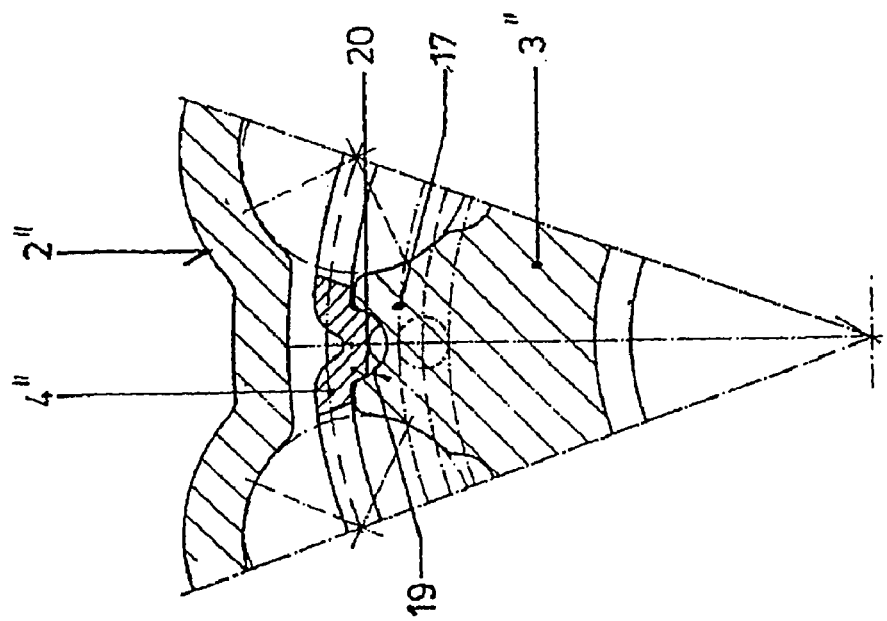

In the case of the embodiment of the sliding articulation 1 shown in FIGS. 5 to 7, the cage 4" is also guided on the inner hub 3". However, in this case centering of the cage 4", which again is a cage 4" configured as a folding cage, on the inner hub 3" takes place by means of cage guide ridges 19 that cage, on the inner hub 3" takes place by means of cage guide ridges 19 that engage in corresponding centering grooves 20 that are formed in the ridges 17 between the raceways 11 of the inner hub 3".

The cage 4" is guided in the inner hub 3" such that due to the length of the guiding surface between the cage and the hub, the cage 4" is not pivotable with respect to the inner hub 3" as shown in FIGS. 6 and 7. Thus, the cage 4" is pivotable only with respect to the outer hub 2".

As is particularly evident from the detail view of FIG. 6, the movement of the balls 6 is limited not only by the stops 8 and 9 in the outer hub 2", but instead, at least one split ring 21 is introduced into the raceways 11 on the inner hub 3", as well, which prevents the balls 6 from exiting from the raceways 11 of the inner hub 3" in the axial direction. The distance between the split rings 21, relative to one another, is greater here than the distance between the two stops 8 and 9 in the outer hub 2" of the sliding articulation 1.

The balls 6 are accommodated in the raceways 7 and 11 in such a manner that they can roll on their center position shown in FIG. 6, between the two stops 8 and 9, with a simultaneous displacement of the inner hub 3" relative to the outer hub 2". In this connection, the center point of the balls 6 can be moved to the left or the right over the distance $1_1$, from the position shown in FIG. 6, as the balls 6 roll, before the balls 6 make contact with one of the stops 8 or 9, as shown with the broken line in FIG. 6. In this connection, the inner hub 3" is displaced relative to the outer hub 2", in the axial direction, over the distance $1_2$, which is twice as great as the distance $1_1$, so that the distance $1_4$, by which the inner hub 3" can be displaced relative to the outer hub 2" by means of rolling of the balls 6, is twice as great as the distance $1_2$.

If the inner hub 3" is moved to the right in FIG. 6, relative to the outer hub 2", the ball 6 makes contact on the outside with the stop 9, and at the same time lies against the left split ring 21 of the inner hub 3" in FIG. 6. Any further relative movement between the inner hub 3" and the outer hub 2" is prevented in this manner. In the opposite direction, if the inner hub 3" is moved to the left in FIG. 6, the ball 6 first makes contact with the stop 8 of the outer hub 2". However, the ball 6 does not yet lie against the right split ring 21 of the inner hub 3" in FIG. 6. This makes it possible to displace the inner hub 3" further to the left in FIG. 6, relative to the outer hub 2", even if the ball 6 has already made contact with the stop 8 in the outer hub 2". When this further displacement of the inner hub 3" relative to the outer hub 2" occurs, however, the ball 6 can no longer roll in the raceways 7 or 11, respectively, since it already rests against the stop 8 on the outside. The further displacement of the inner hub 3" relative to the outer hub 2" therefore takes place in that the ball 6 slides in the raceway 11 of the inner hub 3", until the ball 6 makes contact with the right split ring 21 of the inner hub 3" in FIG. 6. This additional distance over which the inner hub 3" can be displaced relative to the outer hub 2", in the axial direction, when the ball 6 already rests against a stop 8 of the outer hub 2" is indicated in FIG. 6 as $l_3$.

In operation, the ball 6 rolls in the raceways 7 and 11, respectively, during axial displacement of $+/- l_2$ from the center position of the inner hub 3" relative to the outer hub 2" shown in FIG. 6, so that the displacement resistance is minimized. For assembly of the sliding articulation 1, however, the inner hub 3" can be displaced in the axial direction over the distance $l_3$ relative to the outer hub 2", whereby the ball 6 slides in the raceway 11 of the inner hub 3".

The outer hub 2, 2', 2" is preferably formed as a shaped sheet-metal part, i.e. the raceways 7 as well as the centering grooves 13, if applicable, are made in the outer hub 2, 2', 2" without cutting. The raceways 11 in the inner hub 3, 3', 3" and/or the plug-in tooth system 16 provided in the bore 15 can also be made without cutting, for example using a stamping process.

Plastic or sheet steel are suitable as materials for the cage 4, 4', 4", for example.

In order to seal the sliding articulation 1, a protective sheet metal piece 22 can be provided in the outer hub 2, 2', 2". Furthermore, it is possible to seal the sliding articulation 1 towards the outside, on the side opposite the protective sheet metal piece 22, with a folded bellows 23, which is attached to the outer hub 2, 2', 2" by the folded bellows carrier 10.

As in the embodiment shown in FIGS. 1 and 2, the size or shape of the inner and outer hub raceways 11, 7 differs from the size or shape of the centering grooves 13, and the size of the cross-section of the centering grooves 13 is smaller than the size of the cross-section of the inner and outer hub raceways 11, 7, as shown in FIGS. 6 and 7.

The sliding articulation 1 is particularly suitable as a microangle sliding articulation for low angles of inclination between the outer hub 2, 2', 2" and the inner hub 3, 3', 3". In this connection, the angles of inclination during operation should be selected in such a manner that self-locking does not occur.

REFERENCE SYMBOL LIST 1 sliding articulation
2, 2', 2" outer hub
3, 3', 3" inner hub
4, 4', 4" cage
5 window in the cage 4, 4', 4"
6 ball
7 raceway in the outer hub 2, 2', 2"
8 stop
9 stop
10 folded bellows carrier
11 raceway of the inner hub 3, 3', 3"
12 cage guide ridge
13 centering groove
14 ridge of the outer hub 2, 2', 2"
15 central bore of the inner hub 3, 3', 3"
16 plug-in tooth system
17 ridge of the inner hub 3, 3', 3"
18 cage guide ridge
19 cage guide ridge
20 centering groove in the inner hub 3, 3', 3"
21 split ring
22 protective sheet metal piece
23 folded bellows
$A_2$ axis of the outer hub 2, 2', 2"
$A_3$ axis of the inner hub 3, 3', 3"
$l_1$ displacement distance of the center point of the ball 6
$l_2$ displacement distance of the inner hub 3, 3', 3" relative to the outer hub 2, 2', 2" (=2 times $l_1$)
$l_3$ additional distance for displacement of the inner hub 3, 3', 3", relative to the outer hub 2, 2', 2"
$l_4$ total displacement distance of the outer hub 2, 2', 2" relative to the inner hub 3, 3', 3" while the ball 6 rolls (2 times $l_2$).

The invention claim is:

1. A sliding articulation having an axis comprising:
   (a) an outer hub that encloses a cavity and comprising an inner surface and a plurality of outer hub raceways in said inner surface, said outer hub raceways extending parallel to said axis;
   (b) an inner hub accommodated in the cavity and comprising an outer surface and a plurality of inner hub raceways on said outer surface, said inner hub raceways extending parallel to said axis and lying opposite said outer hub raceways, with the inner hub being pivotable with respect to the outer hub;
   (c) a plurality of balls, each ball accommodated in a respective pair of an outer hub raceway and an inner hub raceway, with each pair of an outer hub raceway and an inner hub raceway accommodating only one single ball; and
   (d) one single cage disposed between the outer hub and the inner hub guiding the balls in an axial direction;
   wherein the inner hub is freely displaceable relative to the outer hub in the axial direction between a first stop and a second stop over a first distance by rolling the balls in the inner and outer hub raceways and is displaceable over a second distance by sliding of the balls in the inner and outer hub raceways; and
   wherein the cage is freely displaceable relative to the inner hub and relative to the outer hub, in the axial direction.

2. The sliding articulation as recited in claim 1, wherein the cage is a folding cage.

3. The sliding articulation as recited in claim 1, wherein the outer hub is a shaped sheet-metal part in which the raceways are made without cutting.

4. The sliding articulation as recited in claim 1, wherein the inner hub has a central bore having a plug-in tooth system.

5. The sliding articulation as recited in claim 1, wherein the two stops that delimit the first distance, over which the balls roll in the inner and outer hub raceways, are formed by the ends of the outer hub raceways.

6. The sliding articulation as recited in claim 1, wherein the two stops that delimit the first distance, over which the balls roll in the inner and outer hub raceways, are formed by at least one split ring inserted into the inner hub raceways.

7. A sliding articulation having an axis comprising:
(a) an outer hub that encloses a cavity and comprising an inner surface and a plurality of outer hub raceways in said inner surface, said outer hub raceways extending parallel to said axis;
(b) an inner hub accommodated in the cavity and comprising an outer surface and a plurality of inner hub raceways on said outer surface, said inner hub raceways extending parallel to said axis and lying opposite said outer hub raceways;
(c) a plurality of balls, each ball accommodated in a respective pair of an outer hub raceway and an inner hub raceway; and
(d) a cage disposed between the outer hub and the inner hub guiding the balls in an axial direction;
wherein the inner hub is freely displaceable relative to the outer hub in the axial direction between a first stop and a second stop over a first distance by rolling the balls in the inner and outer hub raceways and is displaceable over a second distance by sliding of the balls in the inner, and outer hub raceways; and
wherein the cage has cage guide ridges that engage in centering grooves of the inner hub, which are formed in ridges between the raceways.

8. The sliding articulation as recited in claim 7, wherein the cage is freely displaceable relative to the inner hub and relative to the outer hub, in the axial direction.

9. The sliding articulation as recited in claim 7, wherein the shape of the inner and outer hub raceways differs from the shape of the centering grooves.

10. The sliding articulation as recited in claim 7, wherein the size of the cross-section of the centering grooves is smaller than the size of the cross-section of the inner and outer hub raceways.

11. A sliding articulation having an axis comprising:
(a) an outer hub that encloses a cavity and comprising an inner surface and a plurality of outer hub raceways in said inner surface, said outer hub raceways extending parallel to said axis;
(b) an inner hub accommodated in the cavity and comprising an outer surface and a plurality of inner hub raceways on said outer surface, said inner hub raceways extending parallel to said axis and lying opposite said outer hub raceways;
(c) a plurality of balls, each ball accommodated in a respective pair of an outer hub raceway and an inner hub raceway; and
(d) one single cage disposed between the outer hub and the inner hub guiding the balls in an axial direction;
wherein the inner hub is freely displaceable relative to the outer hub in the axial direction between a first stop and a second stop over a first distance by rolling the balls in the inner and outer hub raceways and is displaceable over a second distance by sliding of the balls in the inner and outer hub raceways; and
wherein the cage is pivotable with respect to only one of the outer hub or the inner hub.

12. The sliding articulation as recited in claim 11, wherein the cage is freely displaceable relative to the inner hub and relative to the outer hub, in the axial direction.

13. The sliding articulation as recited in claim 11, wherein the shape of the inner and outer hub raceways differs from the shape of centering grooves of the outer hub.

14. The sliding articulation as recited in claim 11, wherein the size of the cross-section of centering grooves of the outer hub is smaller than the size of the cross-section of the inner and outer hub raceways.

* * * * *